United States Patent
Ashby et al.

(10) Patent No.: US 7,197,493 B2
(45) Date of Patent: Mar. 27, 2007

(54) COLLECTION MANAGEMENT DATABASE OF ARBITRARY SCHEMA

(75) Inventors: Gary H. Ashby, Orem, UT (US); Marlo E. Schuldt, Orem, UT (US)

(73) Assignee: Lifestory Productions, Inc., Orem, UT (US)

( * ) Notice: Subject to any disclaimer, the term of this patent is extended or adjusted under 35 U.S.C. 154(b) by 461 days.

(21) Appl. No.: 10/327,578

(22) Filed: Dec. 20, 2002

(65) Prior Publication Data

US 2003/0120673 A1    Jun. 26, 2003

Related U.S. Application Data

(60) Provisional application No. 60/343,861, filed on Dec. 21, 2001.

(51) Int. Cl.
*G06F 17/30* (2006.01)
(52) U.S. Cl. .............. 707/3; 707/1; 707/100; 707/102
(58) Field of Classification Search ........ 707/1–6, 707/100–102, 103
See application file for complete search history.

(56) References Cited

U.S. PATENT DOCUMENTS

| | | | | |
|---|---|---|---|---|
| 5,965,859 | A | 10/1999 | DiVencenzo et al. | 235/380 |
| 6,055,540 | A * | 4/2000 | Snow et al. | 707/103 R |
| 6,055,543 | A * | 4/2000 | Christensen et al. | 707/104.1 |
| 6,147,768 | A | 11/2000 | Norris | 358/1.18 |
| 6,229,566 | B1 | 5/2001 | Matsumoto et al. | 348/233 |
| 6,233,575 | B1 * | 5/2001 | Agrawal et al. | 707/6 |
| 6,288,719 | B1 | 9/2001 | Squilla et al. | 345/350 |
| 6,360,227 | B1 * | 3/2002 | Aggarwal et al. | 707/102 |
| 6,362,900 | B1 | 3/2002 | Squilla et al. | 358/442 |
| 6,463,430 | B1 * | 10/2002 | Brady et al. | 707/3 |
| 6,868,411 | B2 * | 3/2005 | Shanahan | 706/52 |
| 2003/0195877 | A1 * | 10/2003 | Ford et al. | 707/3 |

OTHER PUBLICATIONS

Miller, Michael J., "Forward Thinking", www.pcmag.com, Oct. 1, 2002, PC Magazine, p. 7.
"Photo album software, Virtual Album", from Internet http://www.radar-software.com/valbum/, Mar. 17, 2003.

(Continued)

*Primary Examiner*—Jeffrey Gaffin
*Assistant Examiner*—CamLinh Nguyen
(74) *Attorney, Agent, or Firm*—Pate Pierce & Baird

(57) ABSTRACT

Apparatus and methods for deterministically classifying and indexing objects that are perceived arbitrarily and subjectively, such as digital media and file representations of photographs, in a database. A user establishes various personalized descriptive category sets to organize media, such as digital photographs, video, and audio. The descriptive category sets include categories to describe some aspect or attribute of the objects of the user. Each category may be arbitrarily definable and contain a finite number of descriptors, constituting values within the category. Objects are entered into collections by filtering the objects according to the descriptors of the descriptive category set. A user may thus arbitrarily define a schema of classification according to perceptions, links, experiences, and the like, according to the subjective memory, vocabulary, and mental connections of a user.

30 Claims, 11 Drawing Sheets

OTHER PUBLICATIONS

"ePhotoAlbum—Simply the best software for creating web photo albums", from Internet http://www.picturegear.com/?source=goto, Mar. 17, 2003.

"Photo Album 6 manages your photos, pictures & images with ease", from Internet http://www.showyourphotos.com/, Mar. 17, 2003.

"FlipAlbum 5" from Internet http://flipalbum.com/cl/?x=agoto, Mar. 17, 2003.

"Galt Picture" from Internet http://www.galtech.com/screenshots/pictures.html.

* cited by examiner

COLLECTION MANAGEMENT DATABASE OF ARBITRARY SCHEMA

RELATED APPLICATIONS

This patent application claims the benefit of U.S. Provisional Patent Application Ser. No. 60/343,861 filed Dec. 21, 2001 and entitled Associative Distributed Database of Arbitrary Schema.

BACKGROUND

1. The Field of the Invention

This invention relates to computer software and, more particularly, to novel systems and methods for organizing and retrieving objects such as digital photographs, images, audio recordings, video recordings, or other files stored in databases.

2. The Background Art

The emergence and proliferation of electronic devices, such as digital cameras, video recorders, music players, and other computing devices, has made the storage of digital images, as well as other forms of digital video, audio, files, and the like, more common, inexpensive, and convenient. Due to the decreased expense and increased convenience, a user may acquire these types of media and files more easily and in increased numbers. With these increased numbers, means of organizing and cataloging the media in a manner that the media may be effectively catalogued, classified, searched, associated, and retrieved is an important issue.

Digital media organizers, albums, and the like, typically lack the power to effectively store, catalog, associate, and search vast numbers of media files or other files. Moreover, many include user interfaces that are nonintuitive, lack intuitive methods to organize the media, and do not provide a user the ability to easily configure and personalize the interface.

What is needed is an intuitive, easy to use, powerful database system to effectively catalog, store, associate, search, and retrieve digital media and files so that they are readily accessible and easily manipulated by an unsophisticated user.

What is further needed is a method to arbitrarily classify and associate photographs with key words and phrases that may be selected and personalized by a user on the fly, on any "soft" or hard basis (e.g., logic), thereby providing the features and advantages of an associative database and yet of a pseudo "artificial intelligence" or "fuzzy logic" connection scheme (e.g. association). Moreover, what is further needed is a powerful search engine which may quickly locate photographs according to pre-defined search parameters corresponding to the keys words and phrases previously selected obtaining the benefit of highly deterministic systems, yet benefitting from the highly developed, inherent, "fuzzy logic" types of associations available to a user by virtue of the normal operation of the human brain.

SUMMARY OF THE INVENTION

A primary object of the present invention is to provide apparatus and methods for deterministically classifying and indexing objects, such as digital media and files, in a database, by a user based on deterministic and highly arbitrary and fuzzy logic of a user's mind. A user may be provided a database, such as a relational or associative database. The database may be dynamically expandable as needed as a user desires to add and organize additional media to a collection. At the outset, the invention recognizes that many associations and decisions are used naturally by the mind to discriminate between (sort) various objects, especially something with so many complex memories bound to it, like a photograph has. Although digital photographs are referred to repeatedly in the body of this specification, one of ordinary skill in the art will recognize that apparatus and methods in accordance with the invention may be used to organize, associate, and store other digital media and objects such as images, digital video recordings, digital audio recordings, digital text files, and the like, and are intended to be captured within the scope of the present invention.

A user may configure and set up a database in accordance with the invention without having expertise and training in database systems. Apparatus and methods in accordance with the invention may provide a user the ability to establish various descriptive category sets to organize the media. For example, a user may create a descriptive category set with one or a plurality of categories to categorize a group of objects unique to the user. Each category may by used to describe some aspect or attribute of the objects. In addition, each category may be arbitrarily definable by a user to contain a finite number of descriptors, constituting values within the category.

Once a user has established descriptive category sets according to an organization scheme selected by the user, a user may select objects, such as digital media and files, having attributes perceived by a user to correspond to the descriptive category set. Each object may be uniquely identifiable by a user and also be identified by a unique identifier retrievable by a computer (e.g. file name, etc.). The user may then select a descriptive category set that he or she considers to correspond to the perceived attributes of the objects. A user may create sets by the user's own mental associations and define categories, sets, and fields with words arbitrarily selected due to their unique significance to the user.

The user may create a collection of objects having a collection name and the collection may be characterized by a type corresponding to the selected descriptive category set. Once the collection is established, the user may enter objects into the collection by linking selected ones of the objects with the collection name and by filtering the objects according to correspondence of the attributes of the objects to the descriptors of the descriptive category set. The correspondence of the attributes to the descriptors perceived by a user may be highly subjective and seemingly arbitrary. Nevertheless, a user is typically relying on a complex schema of mentally associated characteristics and memories associated with a picture.

Once the objects have been linked to the descriptors, information identifying the descriptors, categories, and the selected category set may be stored in a database. This information may facilitate future searching for collections, or objects in the collections.

In certain embodiments, the descriptive category set may be modified to include additional categories "on the fly" in response to the presentation of a new object having attributes not conforming to any of the available categories, or having attributes that are better described with an additional or alternate category. These may change as a user's mind considers, consciously or subconsciously, over time the object (e.g., photograph) in the context of memories and significance it elicits due to mental associations. Likewise, additional descriptors may be added to any or all of the descriptive categories to better describe an object included in a collection.

Apparatus and methods in accordance with the invention may provide for searching for collections or objects in a collection using a descriptive category set. A user may select a search criteria such as a descriptor, category, or set, perceived by a user and defined thereby to correspond to attributes of desired objects. In accordance with the invention, the user may then initiate a search of the objects according to the search criteria. The desired objects may then be retrieved to create a subset of the objects corresponding to the search criteria.

Apparatus and methods in accordance with the invention may provide the ability to browse objects in any or all of the collections. In addition, the descriptors, categories, or descriptive category set of a specific object may be modified when entering an object into a collection, browsing a collection, or after searching the collections. Additionally, information used to index and categorize the objects need not be limited to the descriptive category set, categories, and descriptors. Each object in a collection may be indexed and identified with other information arbitrarily selected by a user for a reason unique to the user such as captions, dates, events, and the like.

BRIEF DESCRIPTION OF THE DRAWINGS

The objects and features of the present invention will become more fully apparent from the following description, taken in conjunction with the accompanying drawings. Understanding that these drawings depict only typical embodiments of the invention and are, therefore, not to be considered limiting of its scope, the invention will be described with additional specificity and detail through use of the accompanying drawings in which.

DETAILED DESCRIPTION OF THE PREFERRED EMBODIMENTS

It will be readily understood that the components of the present invention, as generally described and illustrated in FIGS. 1 through 11 herein, could be arranged and designed in a wide variety of different configurations. Thus, the description herein is not intended to limit the scope of the invention, but is merely representative of certain presently preferred embodiments of devices and systems in accordance with the invention. Those of ordinary skill in the art will, of course, appreciate that various modifications to the details herein may easily be made without departing from the essential characteristics of the invention, as described. Thus, the following information is intended only by way of example, and simply illustrates certain presently preferred embodiments consistent with the invention.

The presently preferred embodiments of the invention will be best understood by reference to the drawings, wherein like parts are designated by like numerals throughout.

Figure 1:
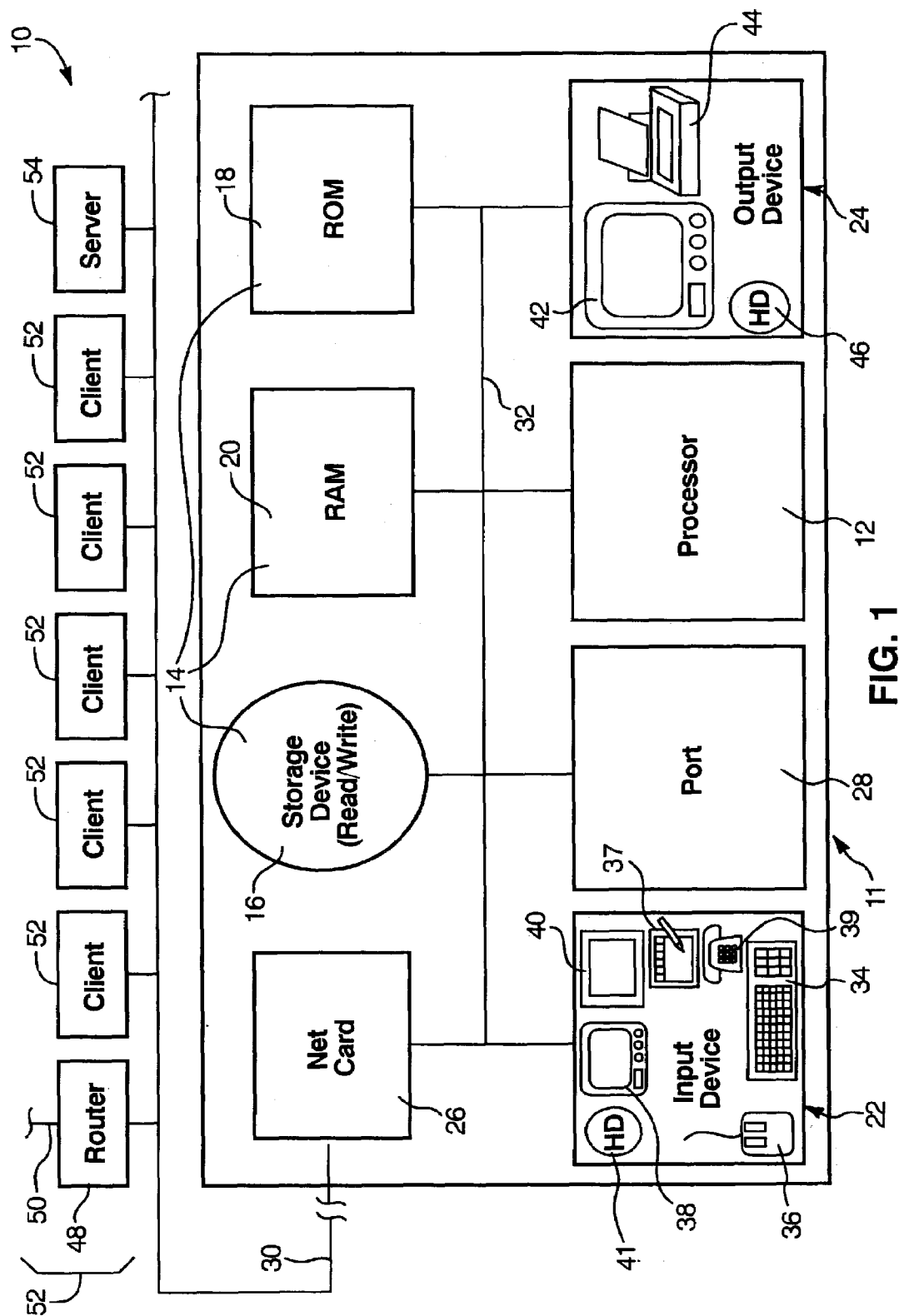
FIG. 1 is a schematic block diagram of one embodiment of computer hardware that may be used to implement an apparatus and method in accordance with the invention.

Referring to FIG. 1, an apparatus 10 may implement the invention on one or more nodes 11, (client 11, computer 11) containing a processor 12 (CPU 12). All components may exist in a single node 11 or may exist in multiple nodes 11, 52 remote from one another. The CPU 12 may be operably connected to a memory device 14. A memory device 14 may include one or more devices such as a hard drive or other non-volatile storage device 16, a read-only memory 18 (ROM 18) and a random access (and usually volatile) memory 20 (RAM 20 or operational memory 20).

The apparatus 10 may include an input device 22 for receiving inputs from a user or from another device. Similarly, an output device 24 may be provided within the node 11, or accessible within the apparatus 10. A network card 26 (interface card) or port 28 may be provided for connecting to outside devices, such as the network 30.

Internally, a bus 32, or plurality of buses 32, may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36 or stylus pad 37. A touch screen 38, a telephone 39, or simply a telecommunications line 39, may be used for communication with other devices, with a user, or the like. Similarly, a scanner 40 may be used to receive graphical inputs, which may or may not be translated to other formats. The hard drive 41 or other memory device 41, such as a CD ROM or DVD drive, may be used as an input device whether resident within the node 11 or some other node 52 (e.g. 52, 54, etc.) on the network 30, or from another network 50.

Output devices 24 may likewise include one or more physical hardware units. For example, in general, the port 28 may be used to accept inputs into and send outputs from the node 11. Nevertheless, a monitor 42 may provide outputs to a user for feedback during a process, or for assisting two-way communication between the processor 12 and a user. A printer 44, a hard drive 46, or other device may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 (e.g. 11, 48, 52, 54) may have various communication capabilities.

In certain embodiments, a minimum of logical capability may be available in any node 52. Note that any of the individual nodes 11, 48, 52, 54 may be referred to, as may all together, as a node 11 or a node 52. Each may contain a processor 12 with more or less of the other components 14–46.

A network 30 may include one or more servers 54. Servers may be used to manage, store, communicate, transfer, access, update, and the like, any practical number of files, databases, or the like for other nodes 52 on a network 30. Typically, a server 54 may be accessed by all nodes 11, 52 on a network 30. Nevertheless, other special functions, including communications, applications, directory services, and the like, may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components 12–46 may need to communicate data with one another. A communication link may exist, in general, between any pair of devices.

Figure 2:
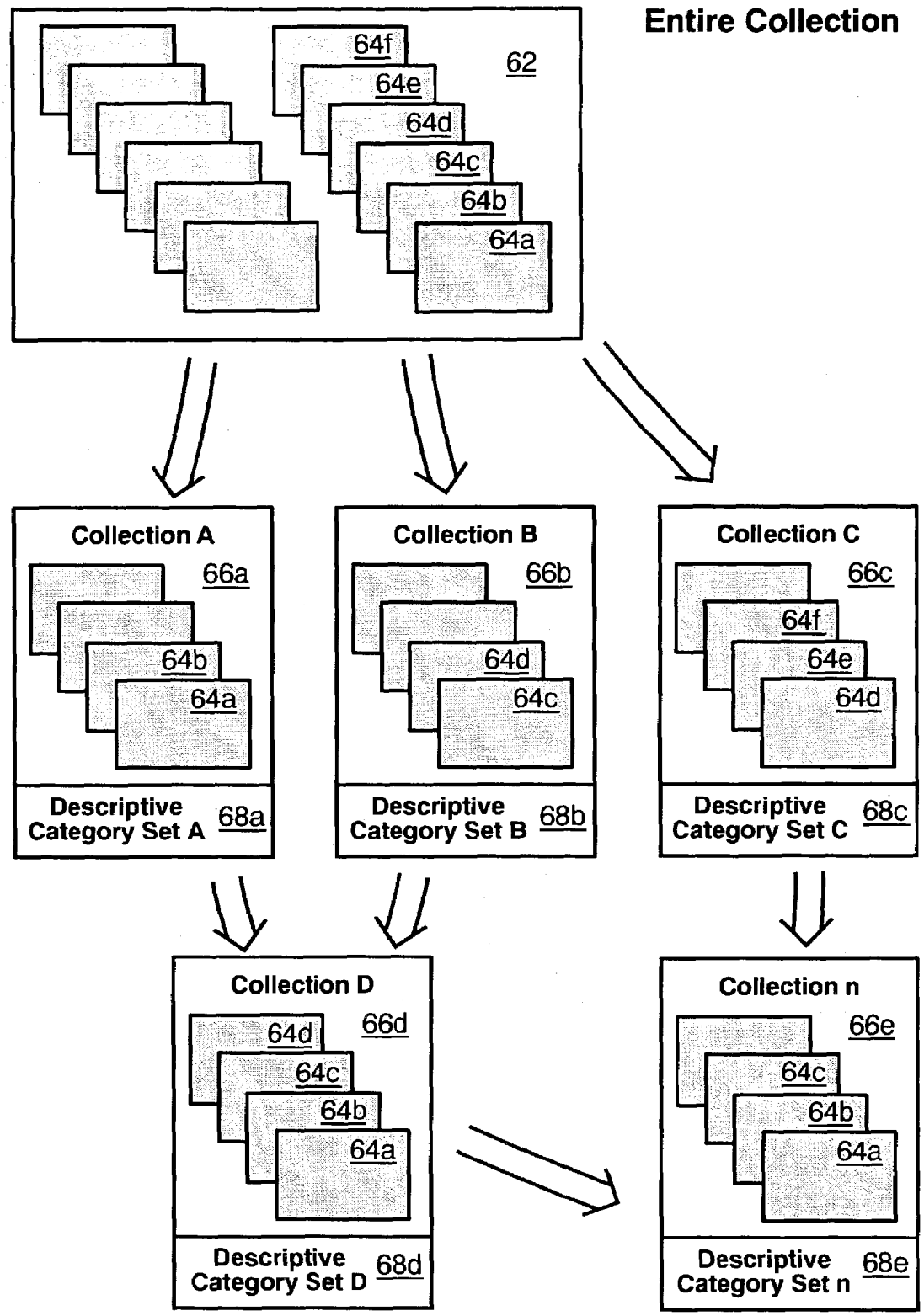
FIG. 2 is a schematic block diagram illustrating one embodiment of a creation process for creating collections associating a group of objects.

Referring to FIG. 2, a group 62 of objects 64, such as digital photographs 64, video recordings 64, audio recordings 64, text files 64, and the like, may be sorted into one or a plurality of collections 66a–e. The sorting may be customized or personalized according to criteria 68a–e for each collection established by a user having, owning, or being associated in some way with the objects 62. The user may establish various descriptive category sets 68a–e in order to classify or catalog each of the objects 64 in each of the collections 66.

For example, a first collection 66a may contain digital photographs related to a particular event, such as a family vacation. Accordingly, a descriptive category set 68a may be used to categorize and index photographs 64a, 64b, for example, related to "vacations." Likewise, a second collection 66b may use a second descriptive category set 68b used to categorize photographs 64c, 64d relating to a holiday.

Similarly, additional collections 66c–e may be used to categorize other photographs 64 into logical groupings using identical or different descriptive category sets 68c–e. Each of the collections 66 may include photographs 64 in common with other collections 66 or each may contain photographs 64 unique to a specific collection 66. In certain embodiments, additional collections 66d, 66e may be created from existing collections 66a, 66b, 66d. Each of these collections 66d, 66e may be characterized by unique descriptive category sets 68d, 68e, or may share a descriptive category set 68d, 68e with another collection 66a–c.

Figure 3:
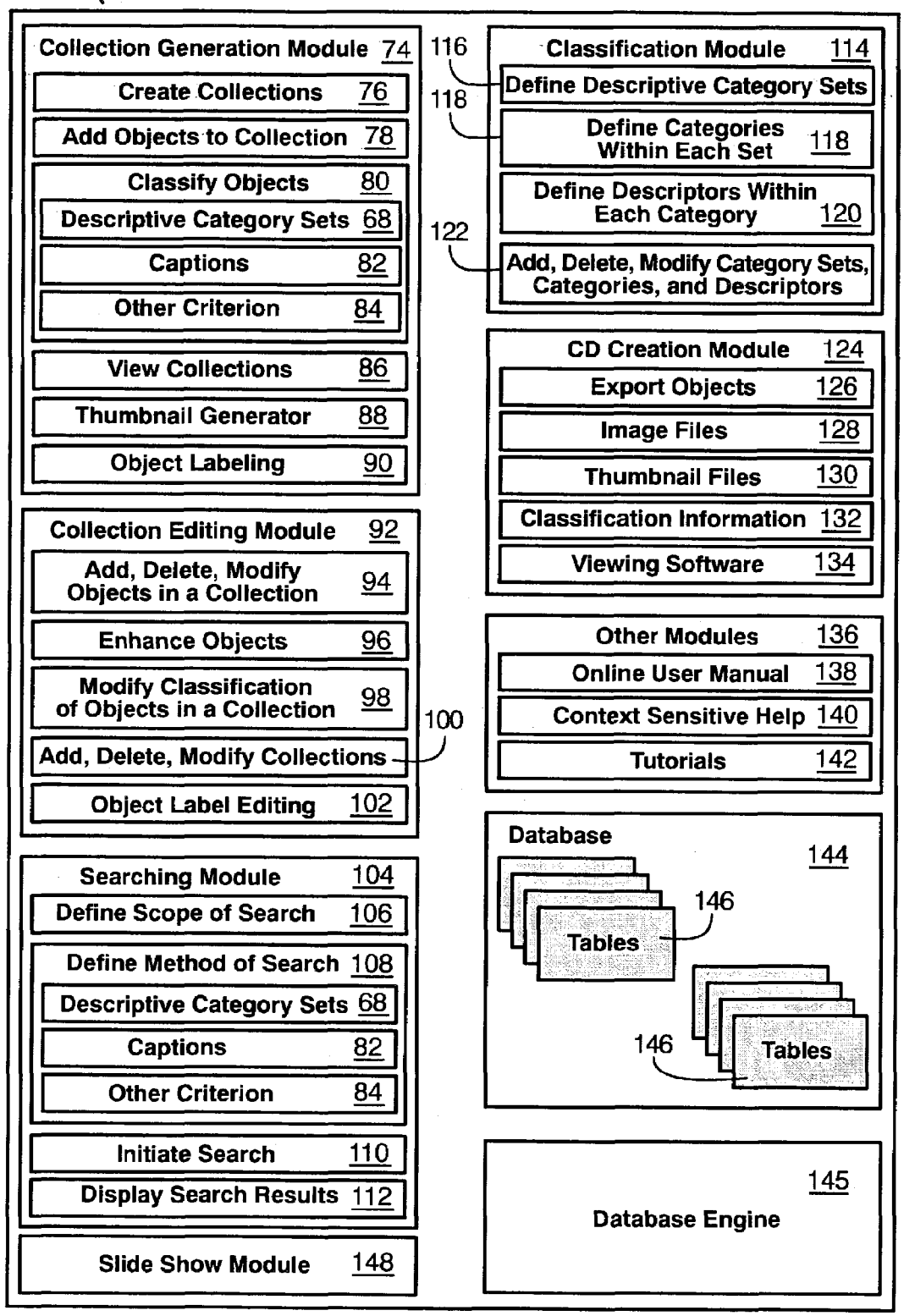
FIG. 3 is a schematic block diagram of one embodiment of modules included in a collection management system in accordance with the invention.

Referring to FIG. 3, one embodiment of a collection management system 72 may be embodied as software data structures to be executed or processed on a computer 11. The collection management system 72 may include a collection generation module 74, a collection editing module 92, a searching module 104, a classification module 114, a CD creation module 124, a database 144, a database engine 145, a slide show module 148, as well as other modules 136.

A collection generation module 74 may include a module 76 for creating collections 66. For example a module 76 may provide a user the ability to name a collection 66, select a descriptive category set 68 corresponding to the collection 66, and import or scan objects 64, such as photographs 64, into a collection 66. As photographs 64 are imported into a collection 66, they may be identified or classified according to the descriptive category set 68 corresponding to the collection 66.

For example, a collection generation module 74 may include a module 80 for classifying or categorizing photographs 64 as they are imported into a collection 66. A user may initially select 68 a descriptive category set 68, having categories and descriptors that the user deems most appropriate for a given group of photographs 64. The user may also enter a caption 82 to each of the photographs 64 in the collection 66. In certain embodiments, the user may also be able to enter an additional text description of any arbitrary length corresponding to a desired object, or collection. The caption 82 may or may not be independent from the descriptive category set 68, selected to classify the group of photographs 64. Likewise, a user may select other criterion 84 to classify any or all of the photographs 64. For example, each photograph 64 may be assigned a date, may be linked to another media or other file, or be assigned some other identifying criterion 84.

The collection generation module 74 may provide the capability to browse 86 or view 86 a collection 66 once created. Objects 64 in the collection 66 may be viewed in any particular order, such as the order objects 64 were imported into a collection 66, in order of size, date, date last modified, or by some other ordering method. In certain embodiments, smaller thumbnails of each photograph 64 may be displayed so a user may easily browse through a collection 66. The thumbnail photographs may be created by a thumbnail generator 88 for each photograph 64 as it is imported into a collection 66.

In certain embodiments, the collection generation module 74, or some other module, may include an object labeling module 90. For example, in the case of digital photographs 64, a photograph 64 may contain details that may not be easily described using a descriptive category set 68, captions 82, or using another criterion 84. For example, a photograph 64 of a family reunion may include many persons within the photograph 64. A caption 82 or descriptive category set 68 may be inadequate to index or identify each person in the photograph 64.

Therefore, an apparatus and method in accordance with the invention may provide the capability to label persons, objects, or other elements, associated with locations on the surface of a digital image 64. In certain embodiments, this labeling information may be stored in another file separate from the digital image file 64. The labels may be placed on or near each of the persons, objects, or items of interest. In certain embodiments, the labels may be selectively displayed or hidden so that a user may view the contents of the photograph 64 behind the label. In selected embodiments, the labels may be selectively displayed or hidden when a user moves a cursor over the corresponding object 64 identified by the label. The labels may provide the capability to label many items or persons of interest within a photograph, adding considerable information to a photograph 64 that may be viewed or searched at a later time.

The collection management system 72 may include a collection editing module 92 for editing objects 64 in the collections 66. For example a module 94 may provide the ability to add, delete, modify, move, or provide some other editing capability of objects 64 in the collections 66. In certain embodiments, a user may be able to edit 96 or enhance 96 particular objects 64 in a collection 66. For example, in the case of photographs 64, a user may be able to perform editing features such as changing the brightness, contrast, color, filters, tint, and the like, to photographs 64 within the collections 66.

In certain embodiments, choosing to enhance 96 or edit 96 a photograph 64 within the collection management system 72 may automatically open an editing application, such as Photoshop, without having to manually exit the collection management system 72 software and manually open the editing software. In addition, when a user has finished using the editing application, a user may be returned directly to the collection management system 72 software in the same manner. An enhanced or edited photograph 64 may be saved directly over a previous unedited version, or a new enhanced version may be saved in the collection 66 in addition to the previous version. In selected embodiments, a user may be able to reverse editing changes made but not desired later.

In addition, not only may objects 64, such as photographs 64, be physically edited within the collection editing module 92, but indexing information, such as captions 82, indexing from corresponding descriptive category set 68, labeling performed by a labeling module 90, and other information 84, may be edited 98. The user may also directly edit 100 collections, such as by changing a name of a collection 66, changing a corresponding descriptive category set 68, deleting objects 64 within a collection 66, or adding, modifying, or deleting a collection 66. The user may also edit 102 an object's labeling, such as by adding, deleting, or modifying the labels, and the like.

The collection management system 72 may include a searching module 104. A user may be required to define 106 a scope of a search. For example, a user may desire to search all collections 66 or may desire to search only individual or groups of collections 66. Once the user has defined the scope of the search, a user may identify 108 a method of searching. For example, a user may search using keywords from object captions 82, terms used to classify objects 64 using descriptive category sets 68, or search using some other criterion, such as an object's date, size, name, file type, last modified date, or the like.

Once a user has established a scope and a method of search, a search may be initiated 110. The searching module 104 may then display 112 the results of the search. This may include providing a list of names of located objects 64, permitting a user to scroll through located objects 64, providing a list of thumbnails of located objects 64, or the like.

The collection management system 72 may include a classification module 114. The classification module 114 may allow a user to establish and define descriptive category sets 68 in order to classify and categorize objects 64 within each collection 66. A user may initially establish 116 a descriptive category set by assigning it a name or type. For example, if a user possesses many photographs 64 of his or her family history, the user may desire to name a descriptive category set "family history." The user may then define 118 categories within a descriptive category set 68.

For example categories 118 within a descriptive category set 68 may include "people," "places," and "occasions." Each category may be helpful in describing photographs 64 related to family history. Within each category 118, a user may define descriptors (e.g. values within the category). For example, under the "people" category, a user may include descriptors such as "cousins," "couples," and "children."

Within the "places" category, a user may include descriptors such as "home," "back yard," and "park." Likewise, within the "occasions" category, a user may include descriptors such as "vacation," "holiday," and "family reunions."

Descriptive category sets 68, once established, may be edited as needed by a user. For example, a user may choose to add an additional category 118. Likewise, a user may choose to add descriptors within any or all of the categories 118.

In certain embodiments, categories and descriptors may be selected from preestablished lists by a user. For example, a user may choose categories from a list of categories to include in a descriptive category set 68. Likewise, a user may choose descriptors from a preestablished list of descriptors to include as values within a particular category. A user may add to or delete from these lists of categories and descriptors as desired.

The collection management system 72 may include a compact disk (CD), or other type of computer-readable media associated with the creation module 124. The compact-disk creation module 124 may provide a convenient process to export objects 64 from collections 66 onto a computer-readable medium for sharing, backing up, archiving, and the like.

In certain embodiments, the compact disk creation module 124 may provide a user the option to select objects 64, collections 66, or groups thereof to burn or copy onto computer-readable media. This may be accomplished by exporting 126 objects 64 or collections 66, such as image files 128, to a specified folder that may be burned onto a compact disk, or other computer-readable media, using appropriate software. In addition, in certain embodiments, the module 124 may export thumbnail files to the folder so a user may preview images 64 in a compressed format before viewing an entire image 64. Indexing information 132 may also be exported to provide a user the ability to search the exported objects 64, or images 64, using the descriptive category sets 68, captions 82, and other criteria 84 that was previously associated with a particular object 64, or image 64.

In certain embodiments, viewing software 134 may be exported with the exported objects 64, or images 64, to provide a method for viewing the objects 64 and collections. The viewing software 134 may include a subset of the features provided by the collection management system 72. For example, the viewing software 134 may allow a user to search and display the collections 66 or objects 64 on exported media. However, the user may not be able to create or edit any of the objects 64 using the viewing software 134. The features included with or lacked by the viewing software 134, compared to the collection management system 72, may be adjusted as needed.

The collection management system 72 may include other modules 136 to perform various functions and tasks. For example, the system 72 may include an online user manual 138. This may simply be a link to a web site on the Internet providing assistance for the system 72 or may download information as needed or requested by a user. This method may provide a convenient solution to provide updated assistance for the collection management system 72.

In other embodiments, the other modules 136 may include a context sensitive help module 140. This module 140 may detect features that a user is using at a time he or she requests assistance. For example, if a user is using the collection generation module 74 and is creating a collection 76, selecting the context sensitive help 140 may automatically display a section of a user manual related to creating collections 76.

Likewise, if the user is using some other features of the collection management system 72, the user may be directed to the appropriate section of a help manual or to other material addressing the user's issue. The context sensitive help module 140 may respond according to a screen a user is using or, alternatively, the module 140 may sense where a user is within a particular process and respond accordingly.

In selected embodiments, other modules 136 may include tutorials 142 to guide a user through selected processes of the collection management system 72. For example, tutorials 142 may include video or audio recordings detailing methods of operation of any or all of the modules within the collection management system 72. The user may also be led through a series of steps or be asked to respond to questions to assist in the learning process.

The collection management system 72 may include a database 144 to index and classify each of the objects 64 and collections 66. The database 144 may be configured as needed to conserve memory resources and may be dynamically expanded or contracted as needed as objects 64 or collections 66 are added or deleted by a user, or as additional indexing information is added or deleted for each of the objects 64 or collections 66. In certain embodiments, the database 144 may include tables 146 to store or index information. One will recognize that tables 146 in a database 144 may be configured and related in many ways to store information related to the objects 64 and collections.

The collection management system 72 may include a database engine 145 to interface with the database 144. The database engine 145 may be used to store, retrieve, and query the database 144 as needed. In addition, a slide show management module 148 may be used to create slide shows of the objects 64 and collections 66. Slide shows may be made up of objects 64 within a collection 66, entire collections 66, or objects 64 across several collections 66. The slide show module 148 may be integrated seamlessly with the collection management system 72 so a user may create slide shows without being required to exit the collection management system 72.

Figure 4:
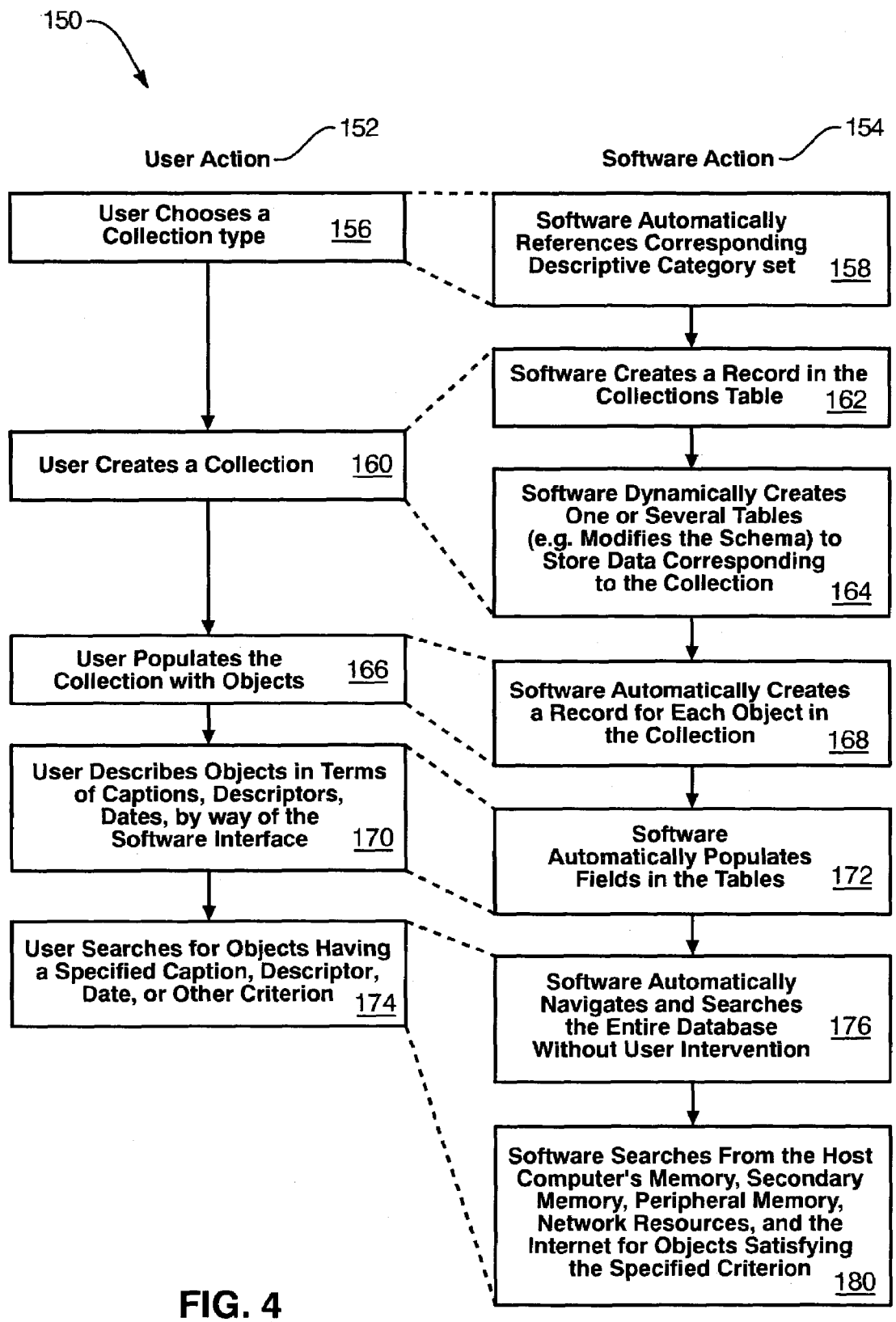
FIG. 4 is a flow diagram of one embodiment of user actions and corresponding software actions in accordance with the invention.

Referring to FIG. 4, an apparatus and method in accordance with the invention may be characterized by actions 152 that a user may perform and actions 154 that the collection management system 72 may perform in response thereto. For example, a user may choose 156 an appropriate collection type in order to classify a group of objects 64. In response, the collection management system 72 may automatically select 158 a descriptive category set 68 that corresponds to the collection type and display, to the user, the categories and descriptors to classify the objects 64.

Once the user has selected 156 a collection type, a user may create 160 a collection 66 by giving it a name. In response, the the collection management system 72 may automatically add 162 a record corresponding to the newly created collection 66 to a database table 146 listing existing collections 66. The the collection management system 72 may then automatically create 164 a table 146, or plurality of tables 146, in the database 144, corresponding to the newly created collection 66, to list each of the objects 64 included therein.

Likewise, a user may choose 166 to populate the tables 146 created in step 164 with objects 64. As the user populates the tables 146 with objects 64, the the collection management system 72 may automatically create 168 a record corresponding to each object 64. This record may be used to store indexing and identification information corresponding to the object 64.

The user may describe 170 the object 64 in terms of the descriptors of the descriptive category set 68, captions 82, and other criterion 84. The collection management system 72 may then automatically store 176 this information in each record or may store the information in another table 146 or record that is linked to the record.

Likewise when a user searches for one or several objects 64 or collections 66, the user may specify descriptors 120, captions 82, or other criterion 84 corresponding to desired objects 64 or collections 66. The collection management system 72 may automatically navigate 176 and search 176 the entire database 144 without requiring the user to personally navigate the database 144. The collection management system 72 may search 180 the host computer's memory 14, as well as network resources 30, and the Internet in certain embodiments, for objects 64 satisfying the criterion specified by the user.

Each of the steps 156, 160, 166, 170, 174 may be performed by the user in any order, or steps may be deleted or added as needed. Likewise, the steps 158, 162, 164, 168, 172, 176, 180 simply represent examples of certain embodiments of actions 154 that may be performed by the collection management system 72 in accordance with the present invention and are not intended to limit the scope thereof.

Figure 5:
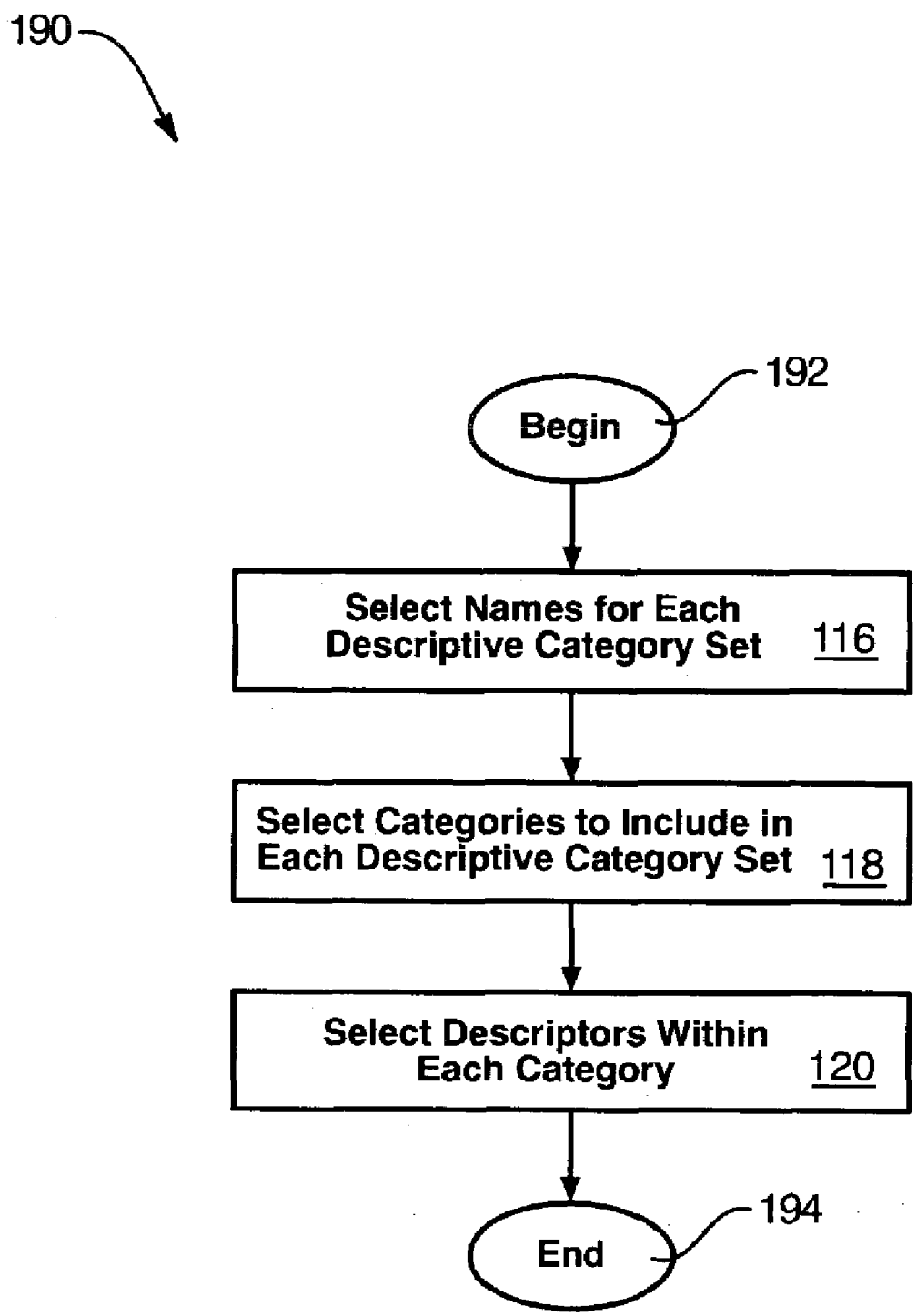
FIG. 5 is a flow diagram illustrating one embodiment of a process whereby descriptive category sets may be created to categorize objects in accordance with the invention.
Figure 6:
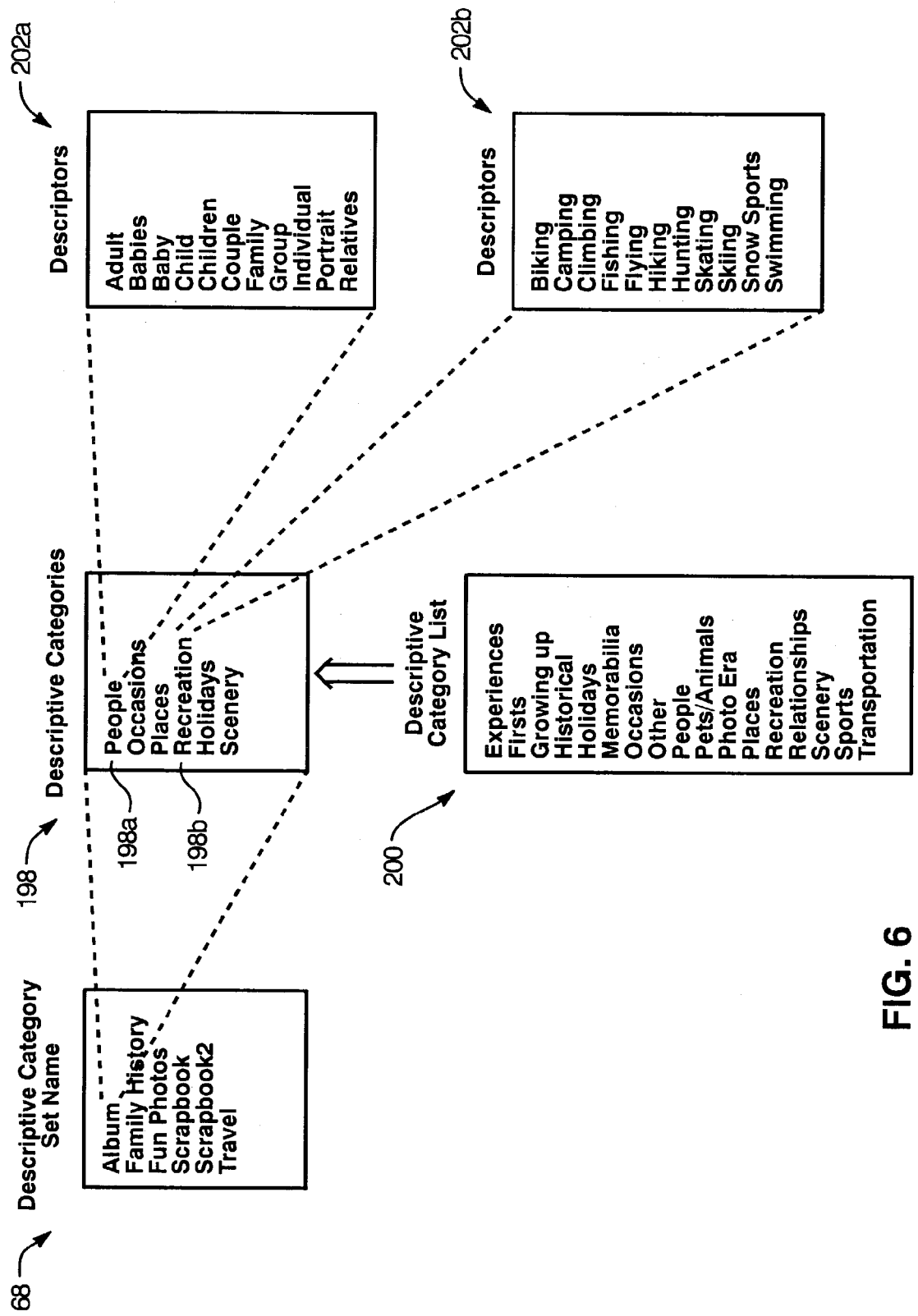
FIG. 6 is a flow diagram illustrating one embodiment of descriptive category sets, descriptive categories, and descriptors used to categorize objects.

Referring to FIGS. 5 and 6, a process 190 for establishing descriptive category sets 68 may include initially selecting 116 names for each set 68. For example, descriptive category sets 68 may, for example, be given names like "album," "family history," or "fun photos," as illustrated in FIG. 6. Once a name has been assigned 116 to a set 68, categories 198 may be selected for each set. For example, with respect to the "album" descriptive category set 68, categories 198 may be selected such as "people," "occasions," "places," "recreation," and the like may be chosen to describe objects 64 described by the set 68. These categories 198 may be selected 118 from a list 200 of categories. Categories may be added or deleted from the list 200 as desired by a user.

Similarly, each of the categories may include descriptors 202a, 202b, selectable 120 by a user, that define values within the category. For example, the category 198a "people" may include a list 202a of descriptors that define values within the "people" category. These values 202a may also be modified, such as by adding or deleting a descriptor 202a from the list 202a. Similarly, another category 198, such as the "recreation" category 198b, may include corresponding descriptors 202b that define values within the category 198b.

Figure 7:
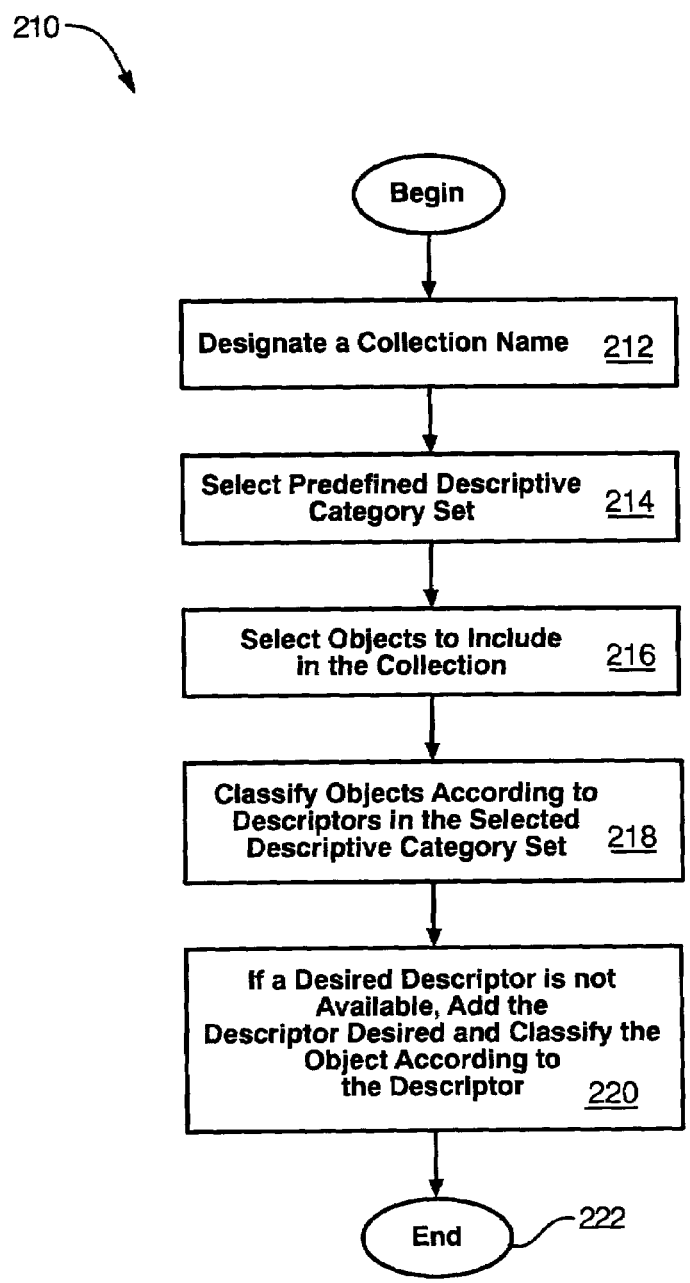
FIG. 7 is a flow diagram illustrating one embodiment of a process for classifying objects to be included in a collection.
Figure 8:
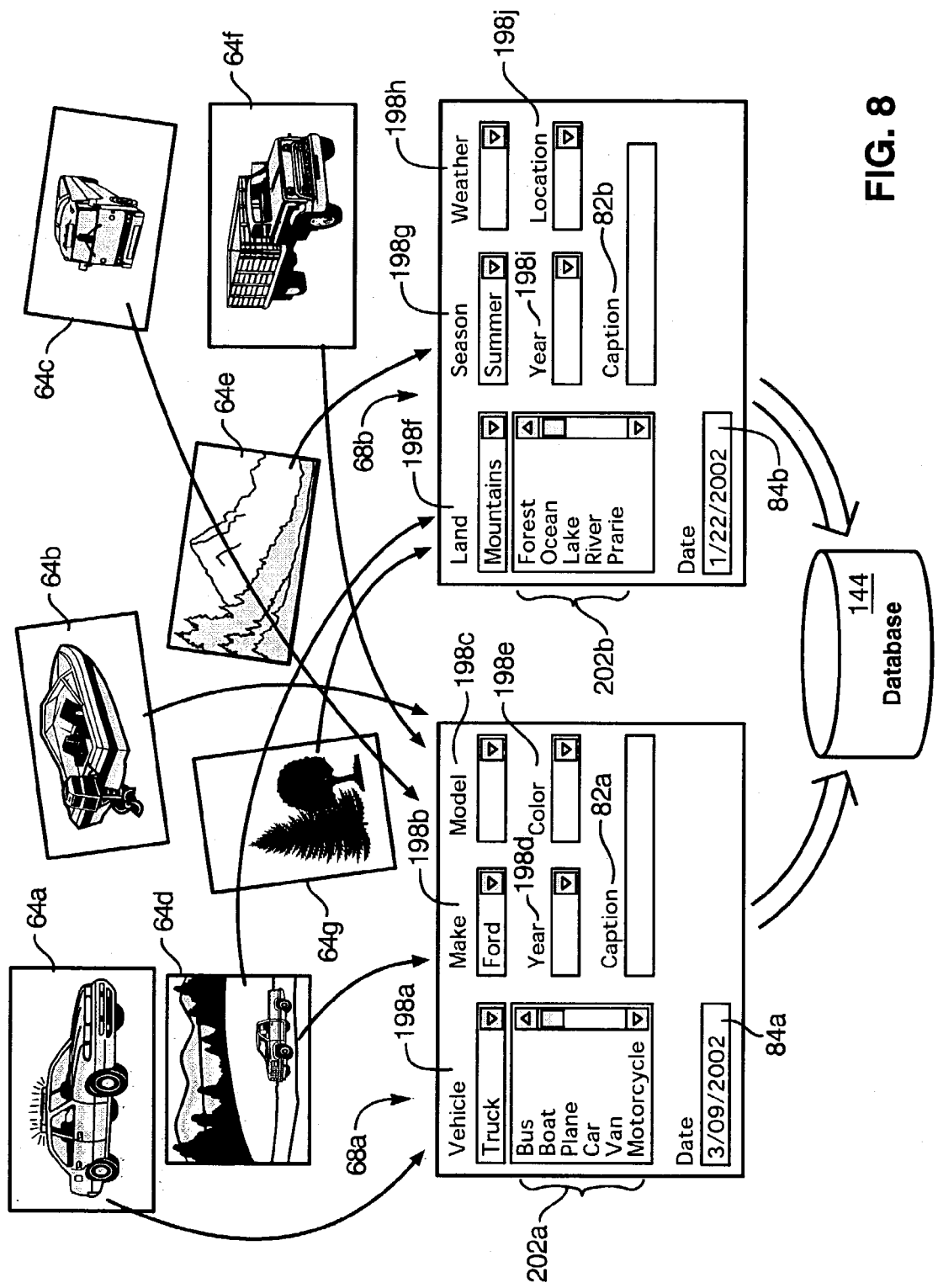
FIG. 8 is a flow diagram illustrating one embodiment of a process for filtering objects with respect to several descriptive category sets in accordance with the invention.

Referring to FIGS. 7 and 8, a process 210 may be used to classify or categorize objects 64 in a collection 66. For example, a user may initially designate 212 a name for a collection 66. For example, a user may name a collection, such as "Summer of 1985" or "Family Vacation to San Diego." Once the user has designated 212 a collection name, the user may select a descriptive category set 68 to describe objects 64, such as photographs 64, to be imported into the collection 66. For example, referring again to FIG. 6, a user may select the descriptive category set 68 named "Travel." Once the user has named a collection 66 and selected a descriptive category set 68 to described objects 64 within the collection, the user may then select 216 objects to enter into the collection 66. For example, if a user possesses photographs 64 that are saved on a hard drive 16 on his or her computer 11, the user may navigate to the location where the photographs 64 are stored and select 216.

The user may then classify 218 the objects 64 according to the descriptive category set 68 selected. For example, referring specifically to FIG. 8, if a user has a collection of photographs 64*a–g*, the user may choose to divide them into one or more collections 66. A first collection 66 may be organized using a first descriptive category set 68*a* and a second collection 66 may be organized using a second descriptive category set 68*b*. With respect to the first collection 66 and corresponding descriptive category set 68, photographs 64*a*, 64*b*, 64*c*, 64*d*, 64*f* may be filtered through the categories 198*a–e* such as, for example, one related to transportation or vehicles. A first category 198*a*, in this example, may be labeled with an identifier like "vehicle" with descriptors 202*a* within the category 198*a*. Likewise another category 198*b* may be designated with another identifier like "make" with corresponding descriptors. Thus a user, may create his or her own descriptive category sets 68 to describe objects 64, such as photographs 64, that are unique to the user.

In a similar manner, photographs 64*d*, 64*e*, 64*g* may be sorted into another collection 66 using a distinct descriptive category set 68*b*. In this example, categories 198*f–j* such as, for example, the category "landscape," having descriptors 202*b*, and the category "season" may be used to describe outdoor photographs 64*d*, 64*e*, 64*g*. In addition, each of the photographs 64*a–j* may be designated with a caption 82*a*, 82*b*, as discussed previously, as well as with other criteria 84*a*, 84*b*, such as a date. Each of the objects 64 may be indexed and associated with the information, such as the descriptors 202, the captions 82, and the other criterion 84, in a database 144.

Figure 9:
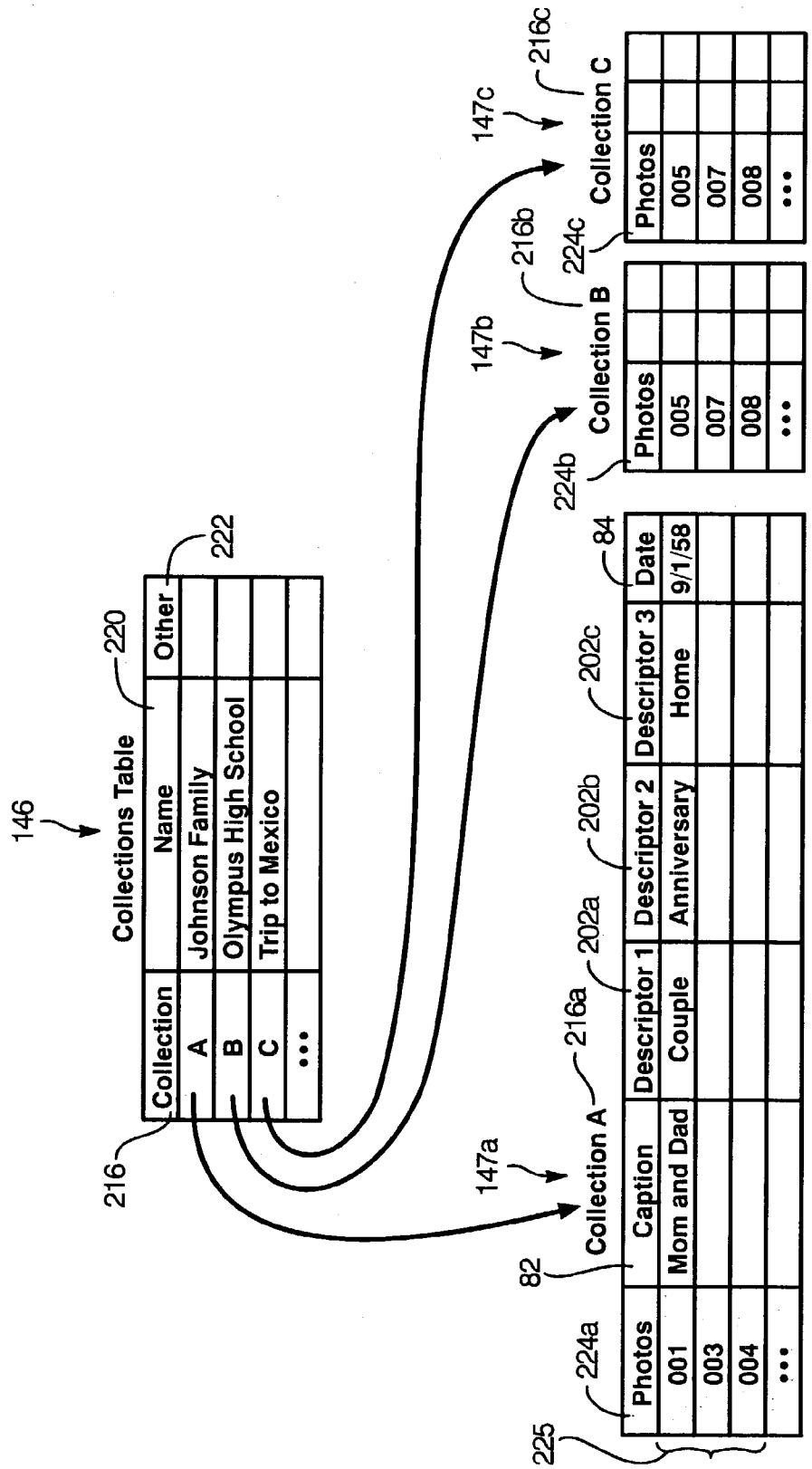
FIG. 9 is a flow diagram illustrating one embodiment of the organization of data in database tables in accordance with the invention.
Figure 10:
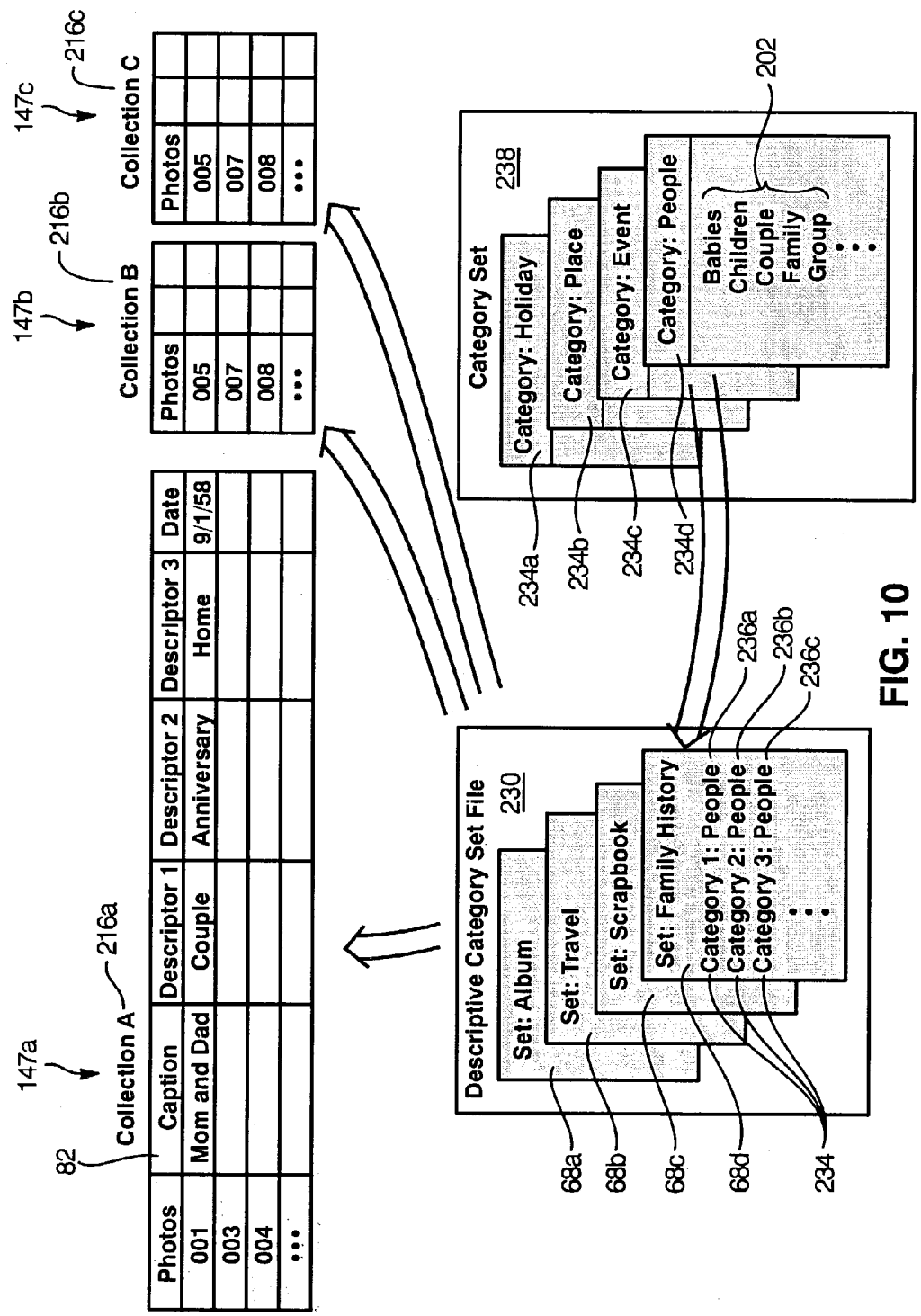
FIG. 10 is a flow diagram illustrating one embodiment of the organization of descriptive category sets, categories, and descriptors in database tables in accordance with the invention.

Referring to FIGS. 9 and 10, one of ordinary skill in the art will recognize that a database may be configured to store information in many different ways. For example, with respect to relational databases, tables may be organized and related to one another in many different embodiments. Thus, the illustrations of FIGS. 9 and 10 describe one of many possible embodiments and are not intended to limit the scope of the present invention.

For example, referring specifically to FIG. 9, in one embodiment, a table 146 may be used to store a list of every collection 216 created in the collection management module 72. For example, a user may have created collections A, B, and C, assigning a name 220 to each collection 216. The table 146 may include additional columns 222 to store additional information 222 as needed to describe each of the collections 216. For example, additional columns may be used to identify the author of a collection, the date a collection was created, the type of collection, and the like.

Other tables 147*a*, 147*b*, 147*c* may be used to store a list of photographs 64, or objects 64, contained in each collection 216. Each photograph 64, or object 64, assigned to a collection 216, may be given a unique index number 225 in order to eliminate or reduce the possibility that two or more photographs 64 or objects 64 are confused with one another. Each time a new photograph 64 is added to a collection 216 in the collection management module 72, the next available number may be assigned thereto.

For example, tables 147*a*, 147*b*, 147*c* may be created to correspond to each of the collections 216. A collection "A" may be stored in a table 147*a*. A table 147*a* may include a list 225 of all of the photographs in the collection 216, each of the photographs 225 comprising a record 225 in the table 147*a*. The table 147, corresponding to each collection 216, may include a column 224*a* where a unique ID number may be stored, a column 82 where a caption may be stored, columns 202*a–c* to store descriptors, a column 84 to store the date of the photograph, and the like. In addition, a table 147 may include other columns as needed to store other information corresponding to a specific photograph 64, or object 62.

Likewise, other tables 147*b*, 147*c* may be used to archive other collections 216 listed in the collections table 146. Each of the tables 147*a*, 147*b*, 147*c* may be created dynamically upon creation of a new collection 216 by a user. Likewise, if a collection 216 is deleted, the corresponding table 66 may be deleted.

Referring to FIG. 10, in certain embodiments, text files 230, 238 may be employed in accordance with the invention. For example, text files 230, 238 may be used to define search sets 68 (descriptive category sets 68), categories 234, and descriptors 202 or characteristics 202 within each category 234. A file 230, such as a structured text file 230, may be used to store information relating to each descriptive category set 68. In certain embodiments, the file 230 may include search set 68 names as section names 68. Categories 234 corresponding to each search set 68 may be stored as keywords 234 in each section 68. For example, if a search set 68*d* is named "family history", categories 234 such as "people" 236*a*, "event" 236*b*, and "place" 236*c* may be stored as keywords 236 in a search set 68*d* entitled "family history."

In certain embodiments, characteristics 202 or descriptors 202 corresponding to each of the categories 234 may be stored in a file 238, such as a structured text file 238. For example, the category 234*d* "people" may include descriptors 202 such as "babies", "children", and "couple" corresponding thereto and stored within a file 238. The descriptive category sets 68, categories 234, and descriptors 202 may be stored and structured in text or other types of files in may different configurations and the example described herein is merely intended to illustrate one of many possible embodiments. In other embodiments, any or all of the descriptive category sets 68, categories 234, and descriptors may be stored and organized within fields of tables in a database.

Figure 11:
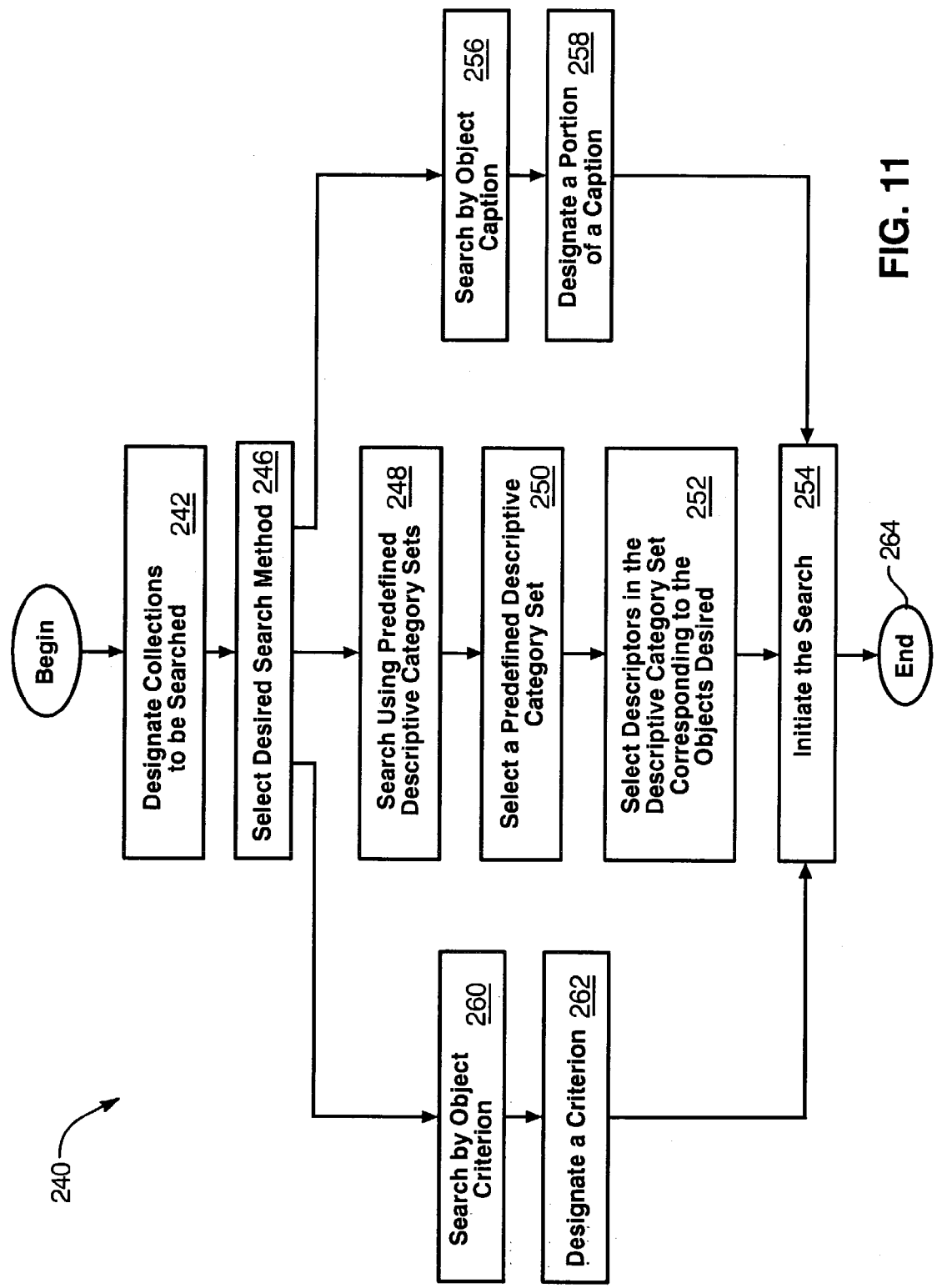
FIG. 11 is a flow diagram illustrating one embodiment of a process for searching for objects categorized in accordance with the invention.

Referring to FIG. 11, a process 240 for searching for objects 64 located in collections 66 may include initially designating 242 collections to be searched. This may include specifying a collection 66 or a group of collections 66. A search method may then be selected 246. For example, a search method may include searching 248 for objects 64 using a descriptive category set 68, searching 256 by caption, searching by some other criterion 260, and the like.

For example, if a user chooses to search 248 using a descriptive category set 68, the user may select 250 a desired descriptive category set 68 having corresponding categories 198. The user may then select 252 descriptors 202 within any or all of the categories 198, the descriptors 202 corresponding to a desired object 62. The search may then be initiated and performed by the collection management system 72.

Alternatively, a user may select 256 a caption 82 corresponding to a desired object 64. A user may indicate a caption 82 to be searched or may simply indicate selected terms or portions of the caption 82. The search may then be initiated and performed by the collection management system 72.

In certain embodiments, the user may search 260 by indicating 262 some other criterion of a desired object 64 such as a date, file size, date last modified, file name, or the like. In other embodiments, the user may search using any combination of the steps 248, 256, 260 described hereinbefore. In addition, in certain embodiments the user may use different forms of boolean logic to perform a search of the objects 64.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

What is claimed is:

1. A method for deterministically classifying digital media files indexed in a database by an end user, the method comprising:

provinding a database;

establishing, by an end user, a plurality of sets, each set comprising a plurality of categories, each category of the plurality of categories being arbitrarily definable by the end user to contain a finite number of descriptors selected arbitrarily by the end user to constitute values within the category. wherein at least two of the sets, categories in a set, or descriptions in a category are non-hierarchical;

selecting, by the end user, digital media flies having attributes perceived by the end user to correspond to a set of the plurality of sets, each digital media file being uniquely identifiable by the end user and identified by a unique identifier retrievable by a computer;

selecting, by the end user, a set from the plurality of sets perceived by the end user to correspond to the perceived attributes;

creating a collection having a collection name and characterized by a type corresponding to the selected set;

entering the digital media flies into the collection by linking selected ones of the digital media files with the collection name by filtering the digital media files according to correspondence of the attributes to the descriptors; and storing information selected to support indexing of and searching for the unique identifier of each of the digital media files in the database based on at least one of the descriptors, categories, and set selected by the end user.

2. The method of claim 1, further comprising modifying a set to add a category in response to the presentation of a new digital media file.

3. The method of claim 2, further comprising modifying a set to add a descriptor in response to the presentation of a new digital media file.

4. The method of claim 3, wherein correspondence of the attributes to the descriptors perceived by the end user is arbitrarily subjective.

5. The method of claim 4, wherein at least one digital media file is selected from the group consisting of a digital image, a digital video recording, and a digital audio recording.

6. The method of claim 5, further comprising:

selecting a search criteria selected from the group consisting of at least one of a descriptor, category, and set, perceived by the end user to correspond to an attribute of a desired digital media file;

searching the digital media files according to the search criteria; and retrieving digital media files to create a subset of the collection corresponding to the search criteria.

7. The method of claim 6, wherein digital media files in the collection are selectively available to be browsed by the end user.

8. The method of claim 7, wherein at least one of the descriptors, categories, and set, corresponding to a digital media file in a collection, are selectively editable while entering the digital media tile into the collection, browsing the collection, and searching the collection.

9. The method of claim 8, further comprising assigning, to each digital media file in a collection, additional information selected from the group consisting of a caption, a date, and an event.

10. The method of claim 1, further comprising modifying the set to add a descriptor in response to the presentation of a new digital media file.

11. The method of claim 1, wherein correspondence of the attributes to the descriptors perceived by the end user is subjective and arbitrary.

12. The method of claim 1, wherein at least one digital media file is selected from the group consisting of a digital image, a digital video recording, and a digital audio recording.

13. The method of claim 1, further comprising:

selecting a search criterion selected from the group consisting of at least one of a descriptor, category, and set, perceived by the end user to correspond to an attribute of a desired digital media file;

searching the digital media files according to the search criterion; and retrieving digital media files to create a subset of the collection corresponding to the search criterion.

14. The method of claim 13, wherein digital media flies in the collection are selectively browsable by the end user.

15. The method of claim 14, wherein at least one of the descriptors, categories, and set corresponding to a digital media file in a collection, is selectively editable while doing at least one of entering the digital media file into the collection, browsing the collection, and searching the collection.

16. The method of claim 1, further comprising assigning, to each digital media file in a collection, additional information selected from the group consisting of a caption, a date, and an event.

17. A method for locating digital media files unique to an end user and indexed in a database, the method comprising:

establishing, by an end user, a plurality of sets, each set comprising a plurality of categories, each category of the plurality of categories being arbitrarily definable byte end user to contain a finite number of descriptors selected arbitrarily by the end user to constitute values within the category, wherein at least two of the sets, categories in a set, or descriptors in a category are non-hierarchical:

establishing, byte end user, a collection of digital media files, each digital media file being uniquely identifiable by the end user and identified by a unique identifier retrievable by a computer, the collection having a collection name and a type corresponding to a set of the plurality of sets;

selecting a search criterion selected from the group consisting of at least one of a descriptor, category, and set, perceived by the end user to correspond to an attribute of a desired digital media file within the collection;

searching the collection of digital media files according to the search criterion; and retrieving digital media files having attributes corresponding to the search criteria.

18. The method of claim 17, Thither comprising modifying a set to add a category to identify an additional attribute.

19. The method of claim 18, Thither comprising modifying a set to add a descriptor to identify an additional attribute.

20. The method of claim 19, wherein the correspondence of the attributes to the descriptors, categories, and set, is subjective and arbitrary.

21. The method of claim 20, wherein at least one digital media file is selected from the group consisting of a digital image, a digital video recording, and a digital audio recording.

22. The method of claim 21, wherein digital media files in the collection are selectively available to be browsed by the end user.

23. The method of claim 22, wherein at least one of the descriptors, categories, and set, corresponding to a digital media file in a collection, are selectively editable once the digital media file is retrieved.

24. The method of claim 23, wherein the search criteria further includes information selected from the group consisting of a caption, a date, and an event.

25. The method of claim 17, further comprising modifying a set to add a descriptor to identify an additional attribute.

26. The method of claim 17, wherein the correspondence of the attributes to the descriptors, categories, and set, is subjective.

27. The method of claim 17, wherein at least one digital media file is selected from the group consisting of a digital image, a digital video recording, and a digital audio recording.

28. The method of claim 17, wherein digital media files in the collection are selectively available to be browsed by the end user.

29. The method of claim 17, wherein at least one of the descriptors, categories, and set, corresponding to a digital media file in a collection, are selectively editable once the digital media file is retrieved.

30. The method of claim 17, wherein the search criterion further includes information selected from the group consisting of a caption, a date, and an event.

* * * * *